(12) United States Patent
Arévalo Rodríguez et al.

(10) Patent No.: US 8,418,963 B2
(45) Date of Patent: Apr. 16, 2013

(54) AIRCRAFT LOAD FRAME MADE OF A COMPOSITE MATERIAL

(75) Inventors: Elena Arévalo Rodríguez, Madrid (ES);
Cesar Bautista De La Llave, Madrid (ES); Cristina Ortega Juaristi, Madrid (ES)

(73) Assignee: Airbus Operations S.L., Madrid (ES)

( * ) Notice: Subject to any disclaimer, the term of this patent is extended or adjusted under 35 U.S.C. 154(b) by 1158 days.

(21) Appl. No.: 11/729,990

(22) Filed: Mar. 29, 2007

(65) Prior Publication Data

US 2008/0179460 A1  Jul. 31, 2008

(30) Foreign Application Priority Data

Jan. 29, 2007  (WO) ................. PCT/ES2007/070020

(51) Int. Cl.
*B64C 1/00* (2006.01)
(52) U.S. Cl.
USPC ...... 244/133; 244/119; 244/123.1; 244/123.3

(58) Field of Classification Search ................... 244/133, 244/119, 123.1, 123.3
See application file for complete search history.

(56) References Cited

U.S. PATENT DOCUMENTS

| | | | |
|---|---|---|---|
| 4,786,343 A * | 11/1988 | Hertzberg | 156/93 |
| 6,217,000 B1 * | 4/2001 | Younie et al. | 249/184 |
| 6,889,937 B2 * | 5/2005 | Simpson et al. | 244/123.1 |
| 2008/0111024 A1 * | 5/2008 | Lee et al. | 244/121 |
| 2008/0210821 A1 * | 9/2008 | Tanner et al. | 244/123.3 |

* cited by examiner

*Primary Examiner* — J. Woodrow Eldred
(74) *Attorney, Agent, or Firm* — Ladas & Parry LLP

(57) ABSTRACT

The present invention relates to an aircraft load frame (1) made of a composite material, characterized in that it comprises two side elements (2, 3) and a base element (7), the side elements (2, 3) being joined at the inner part of the frame (1) by means of the base element (7) and each of the side elements (2, 3) comprising a leg (4) joining the frame (1) to the aircraft fuselage skin, a web (5) and a lower flange (6) joining the web (5) and the base element (7).

8 Claims, 3 Drawing Sheets

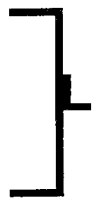  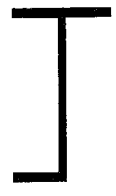
FIG 1   FIG 2   FIG 3
PRIOR ART
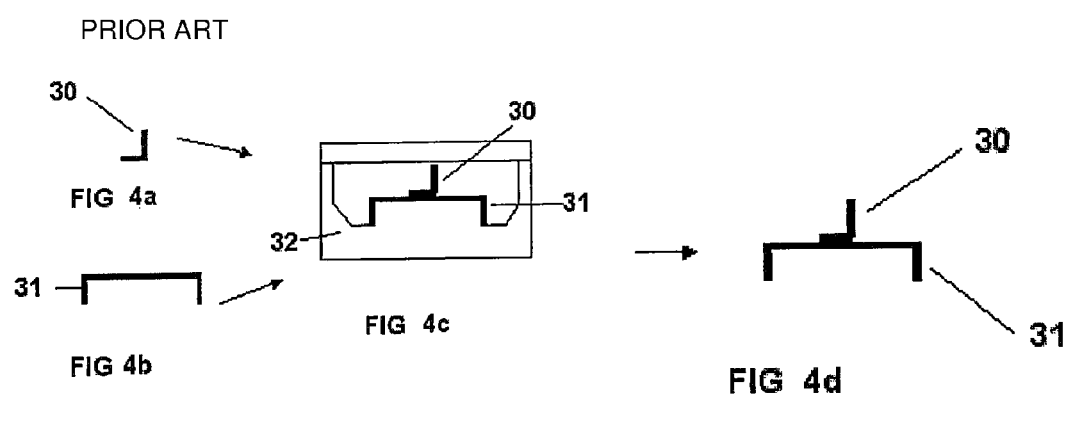
FIG 4a   FIG 4b   FIG 4c   FIG 4d
PRIOR ART   PRIOR ART   PRIOR ART   PRIOR ART

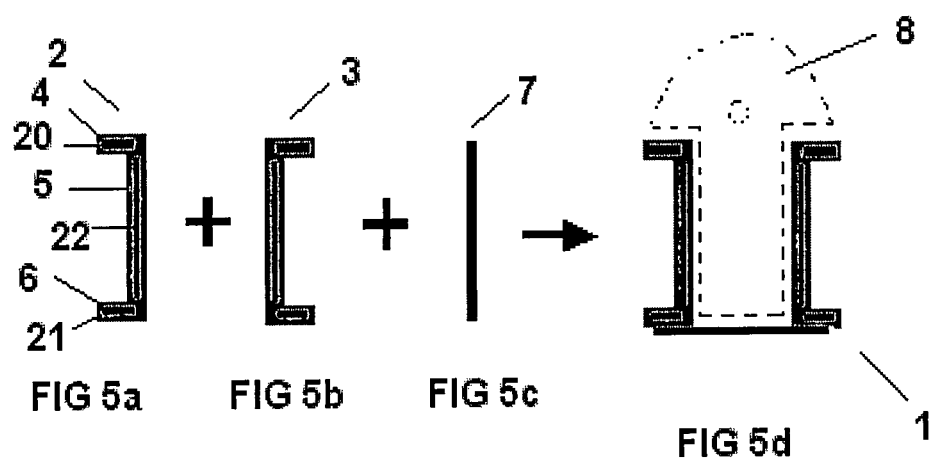
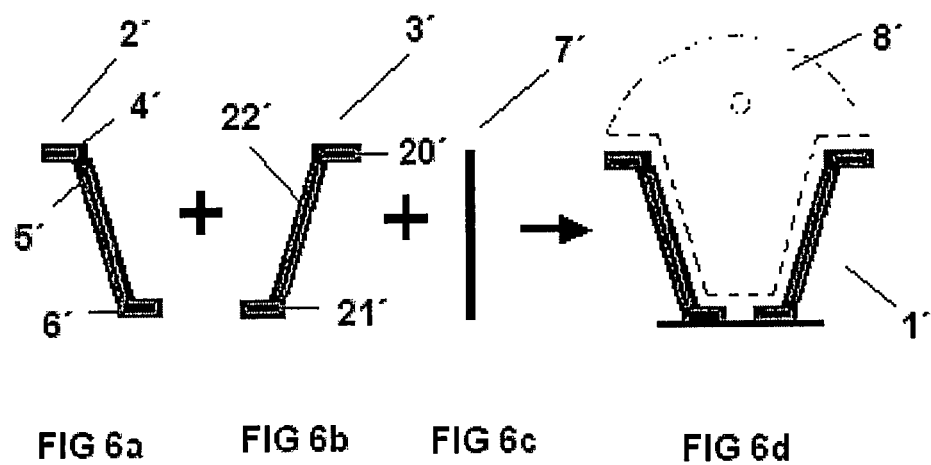

AIRCRAFT LOAD FRAME MADE OF A COMPOSITE MATERIAL

FIELD OF THE INVENTION

The present invention relates to an aircraft load frame made of a composite material.

BACKGROUND OF THE INVENTION

In addition to conferring strength and rigidity to the aircraft fuselage, load frames are structural elements in charge of withstanding and transferring the loads from other structural elements of the aircraft, such as the wings or stabilizers.

These load frames are generally metallic and have different sections, the most common being C, I and J-shaped sections which achieve a framework of ribs through machining processes, stabilizing the center of the frame.

The strength to weight ratio is a very important aspect in the aeronautical industry today, and for this reason frames made of or optimized with composite materials, mainly carbon fiber, are being used instead of metallic frames.

Carbon fiber form, but not load, frames are currently known since it is very difficult to compete with a machined metallic frame because due to the high demands withstood by said frames, they need to have a framework of stiffeners by way of ribs to stabilize the frame, greatly complicating the process of making it of carbon fiber.

The object of the present invention is an aircraft load frame made of a composite material.

SUMMARY OF THE INVENTION

The present invention proposes an aircraft load frame made of a composite material with a geometry providing a distribution of loads optimizing the current design of metallic load frames in terms of weight.

The invention therefore describes a frame for aircraft comprising three elements: two side elements forming the legs, webs and inner flanges of the frame, and a base element joining the two previously mentioned side elements.

Unidirectional fiber reinforcements are predominant in the legs and inner flanges of the frame, as well as in the base joining the side elements, whereas the webs of the frame are formed by multidirectional fibers, with a predominance of fibers at +/−45°, considering 0° to be the circumferential direction of the frame, so as to prevent their buckling and to optimize them.

Other features and advantages of the present invention will be understood from the following detailed description of the illustrative claims of its object in relation to the attached drawings.

BRIEF DESCRIPTION OF THE DRAWINGS

FIG. 1 shows a C-shaped cross section of an L-shaped stiffener of a metallic frame known in the art.

FIG. 2 shows an I-shaped cross section of a metallic frame known in the art.

FIG. 3 shows a J-shaped cross section of a metallic frame known in the art.

FIGS. 4a, 4b, 4c and 4d show a scheme of the steps of the manufacturing process for a frame with a stiffener made of a composite material according to the process known in the art.

FIGS. 5a, 5b, 5c and 5d show a load frame made of composite material and the scheme of the steps of its manufacturing process according to a first embodiment of the invention.

FIGS. 6a, 6b, 6c and 6d show a load frame made of composite material and the scheme of the steps of its manufacturing process according to a second embodiment of the invention.

DETAILED DESCRIPTION OF THE INVENTION

Figure 7:
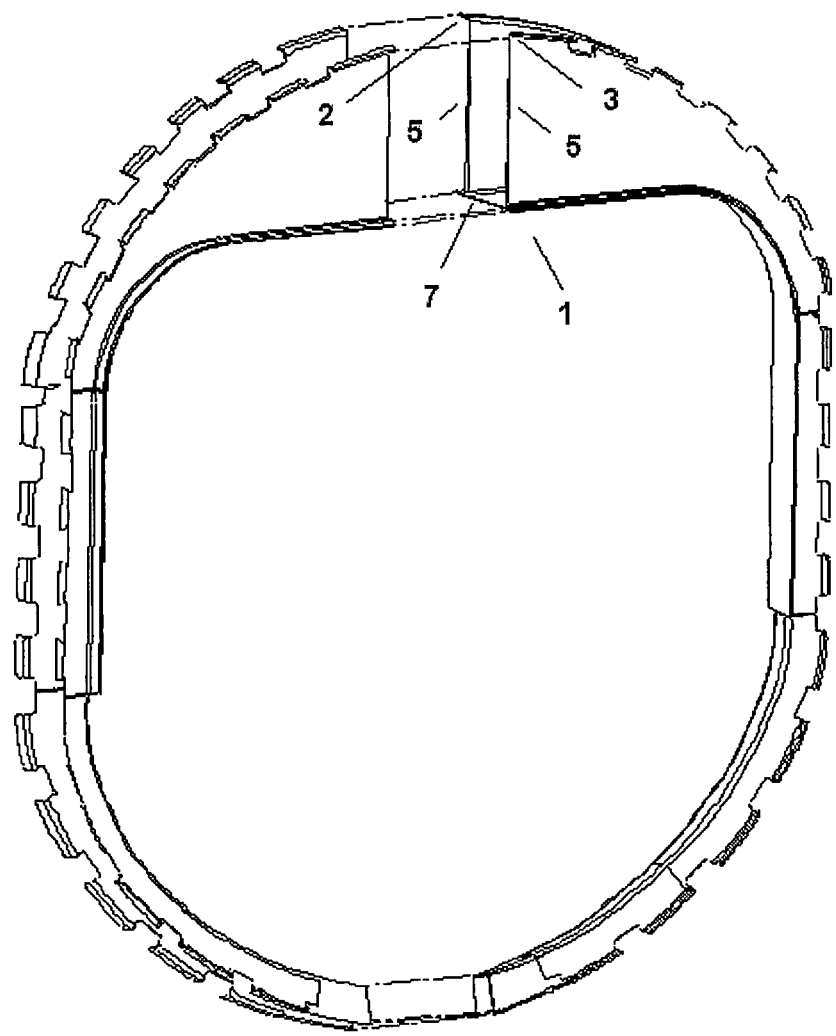
FIG. 7 shows a general view of a load frame according to the invention.

According to a first embodiment of the invention, a frame 1 with a π-shaped section is proposed comprising three elements: two side elements 2 and 3 and a base element 7 joining the inner flanges of the previously mentioned side elements 2, 3 of the frame. Each of the side elements 2, 3 further comprises the following parts: a leg 4 for joining the frame 1 and the skin of the aircraft fuselage; a web 5 which is the thin part and which in some cases, depending on the function the frame is to carry out, forms a 90° angle with the leg 4, being able to form any other angle, and an inner flange 6 joining the web 5 and the base element 7.

The leg 4, the inner flange 6, and the web 5 of the frame 1 are formed by layers of composite material arranged at 0°, +/−45° and 90°.

The composite material can be fiber carbon or fiberglass with thermosetting or thermoplastic resin.

Unidirectional fiber reinforcements 20, 21 are predominant both in the leg 4 and in the inner flange 6 at 0°, made of the same material or of a compatible material, longitudinally extending along the entire frame 1 continuously. The material of the reinforcements 20, 21 has a high modulus of elasticity such that it gives the leg 4 and the inner flange 6 high strength and high stiffening capacity.

The web 6 of the frame 1 can also have reinforcements 22 made of the same material or of a compatible material in any direction. The reinforcements 22 of the web 5 of the frame 1 can be continuous along the entire frame or they can be local, depending on the demands the frame 1 is subjected to. This means that the web 5 is thus able to withstand much greater loads than if it were exclusively made of fabric at +/−45°.

The base element 7 of the frame 1 is formed by layers of unidirectional tape, stacked with different orientations, with a high percentage of such tapes in the longitudinal direction (0°). The base element 7 thus has a high modulus of elasticity in the longitudinal direction as a result of the high percentage of fibers in said direction, which extend continuously along the entire frame 1.

One of the possible processes for the manufacture of the base element 7 is the automatic tape layer (ATL). This base element 7 can be riveted, glued or sewn to the inner flanges 5 of the frame 1, thus closing the section of said frame 1. The thicknesses and the sections of the side elements 2, 3 and of the base element 7 are variable.

In addition to provided the advantages of a closed section as a result of having the inner flanges facing outwardly, the π-shaped section of the frame 1 proposed by the invention also facilitates the subsequent installation of systems and the attachment of the aircraft wiring.

The frame 1 of the invention in many cases has local load inputs through fittings 8 joined to the webs 5 of the frame 1. The frame 1 together with the skin form a torsion box, therefore the assembly has a high torsional stiffness, the shear load transferred by these fittings 8 thus being advantageously distributed between two faces formed by the webs 5.

According to a second embodiment of the invention, a frame 1' is proposed for aircraft with a U-shaped section, the webs 5' of which form a certain angle with the legs 4' according to the function the frame 1' is to carry out. In this case, as can be seen in FIGS. 6a to 6d, the bending direction of the inner flanges 6' is changed since the riveting of the inner flanges 6' to the base 7' could not otherwise be done.

In both embodiments, whether or not the webs are inclined it is necessary to be able to ensure that the fittings can be inspected. In the case of vertical webs, this accessibility can be achieved by making the riveting of the base element 7 detachable. In the case of inclined webs, holes called handholes would have to be made in the base element 7 which would allow inspecting the fittings 8 or enabling caps. On the other hand and as a result, the riveting of the base element 7 to the inner flange 6 could be done without using blind rivets.

The frame with a π-shaped section described by either of the two embodiments of the invention can extend along the entire frame 1, 1' or encompass only a certain section thereof. This concept of a frame with a π-shaped section can further be applied to different fuselage sections, such as a circular, ellipsoidal or rectangular section or the like.

This concept of a frame with a π-shaped section according to the invention is furthermore compatible with other frame sections. Thus, for example, in areas far from the load input the same frame with a r-shaped section can go from a frame with sections having a side element with a web and leg forming a 90° angle and the other side element with a web and leg forming an angle that is greater than 90°, to traditional C, J and I-shaped sections, and even Ω-shaped sections, with a suitable transition and joining as can be seen in FIG. 7.

The manufacturing process of the elements forming the frames 1, 1' made of a composite material described above is done separately.

As can be seen in FIGS. 4a to 4d, the traditional carbon fiber frames, such as a C-shaped frame 31 for example with an L-shaped stiffener made of a composite material are usually manufactured by means of the resin transfer molding (RTM) process, using a closed and pressurized mold 32 for that purpose where dry preforms 30 and 32 are placed, the resin being subsequently injected. This known process allows making complex parts.

The side elements 2, 3 forming the frames 1, 1' out of a composite material of the present invention are manufactured separately, preferably by means of conventional resin transfer molding (RTM). The base part 7 closing the section of the frame is preferably manufactured by means of an ATL process. These elements will be later joined together to form the frame, obtaining a closed section that can include section and thickness changes based on simpler elements. Therefore, since these three elements are manufactured separately, each one with thickness and section variations, the load frame obtained when they are joined together is optimized, obtaining a variable closed section in a simple manner. The manufacturing process of the side elements 2, 3 forming the frames 1, 1' of a composite material preferably comprises the following steps:
 a) cutting fabrics and manufacturing patterns by means of a blade or water jet;
 b) manufacturing the preforms by means of the manual stacking of the patterns, sewing and cold or hot compaction;
 c) placing the preforms in the mold;
 d) applying a vacuum;
 e) injecting resin by applying pressure;
 f) curing the resin by means of applying heat;
 g) demolding.

The base element 7 is preferably manufactured by means of ATL, this process consisting of the following steps:
 a) automatic stacking of fabrics;
 b) hot forming;
 c) vacuum bag placement
 d) autoclave curing.

Any modifications comprised within the scope defined by the attached claims can be introduced in the embodiments described above.

The invention claimed is:

1. An aircraft load frame (1) made of a composite material, comprising two side elements (2, 3) and a base element (7), the side elements (2, 3) being joined at an inner part of the frame (1) by the base element (7) and each of the side elements (2, 3) comprising a leg (4), a web (5), and a lower flange (6) joining the web (5) and the base element (7),
 wherein
  the base element (7) is formed by layers of unidirectional tape, stacked with different orientations, such tapes being predominantly in a longitudinal direction and extending continuously along the frame (1) such that the base element (7) has a high modulus of elasticity in the longitudinal direction,
  the leg (4) and the inner flange (6) each have unidirectional fiber reinforcements (20, 21) at 0° with respect to the longitudinal direction of the leg (4) and the inner flange (6), respectively, the unidirectional fiber reinforcements (20, 21) longitudinally extending along the frame (1) continuously, and
  the web (5) has continuous or local reinforcements (22) in any direction.

2. An aircraft load frame (1) made of a composite material according to claim 1, wherein the web (5) of the side elements (2, 3) is perpendicular to the leg (4) and the inner flange (6).

3. An aircraft load frame (1) made of a composite material according to claim 1, wherein the web (5) of the side elements (2, 3) forms an angle that is greater than 90° in relation to the leg (4), forming a corresponding supplementary angle in relation to the inner flange (6).

4. An aircraft load frame (1) made of a composite material according to claim 1, wherein the leg (4), the web (5), and the inner flange (6) are formed by layers of composite material.

5. An aircraft load frame (1) made of a composite material according to claim 4, wherein the layers of composite material of the leg (4), the web (5), and the inner flange (6) are arranged at +/−45° with respect to the longitudinal direction of the leg (4), the web (5), and the inner flange (6), respectively.

6. An aircraft load frame (1) made of a composite material according to claim 5, further comprising layers of composite material of the leg (4), the web (5), and the inner flange (6) arranged at 0° or 90° with respect to the leg (4), the web (5), and the inner flange (6), respectively.

7. An aircraft load frame (1) made of a composite material according to claim 1, further comprising fittings (8) for local load inputs.

8. An aircraft load frame (1) made of a composite material according to claim 1, wherein a section of the frame (1) and a thickness of the section of said frame (1) are different in different places.

* * * * *